Nov. 20, 1956 J. J. ZIMMERMAN 2,771,048

AUTOMATIC SOLDERING MACHINE

Filed Feb. 1, 1955 6 Sheets-Sheet 1

INVENTOR.
Jack J. Zimmerman
BY Mueller & Aichele
Attys.

Nov. 20, 1956 J. J. ZIMMERMAN 2,771,048

AUTOMATIC SOLDERING MACHINE

Filed Feb. 1, 1955 6 Sheets-Sheet 2

INVENTOR.
Jack J. Zimmerman
BY
Mueller & Aichele
Attys.

Nov. 20, 1956 J. J. ZIMMERMAN 2,771,048

AUTOMATIC SOLDERING MACHINE

Filed Feb. 1, 1955 6 Sheets-Sheet 3

INVENTOR.
Jack J. Zimmerman
BY
Mueller & Aichele
Attys.

Nov. 20, 1956 J. J. ZIMMERMAN 2,771,048

AUTOMATIC SOLDERING MACHINE

Filed Feb. 1, 1955 6 Sheets-Sheet 4

INVENTOR.
Jack J. Zimmerman
BY
Mueller & Aichele
Attys.

Nov. 20, 1956 J. J. ZIMMERMAN 2,771,048
AUTOMATIC SOLDERING MACHINE
Filed Feb. 1, 1955 6 Sheets-Sheet 5
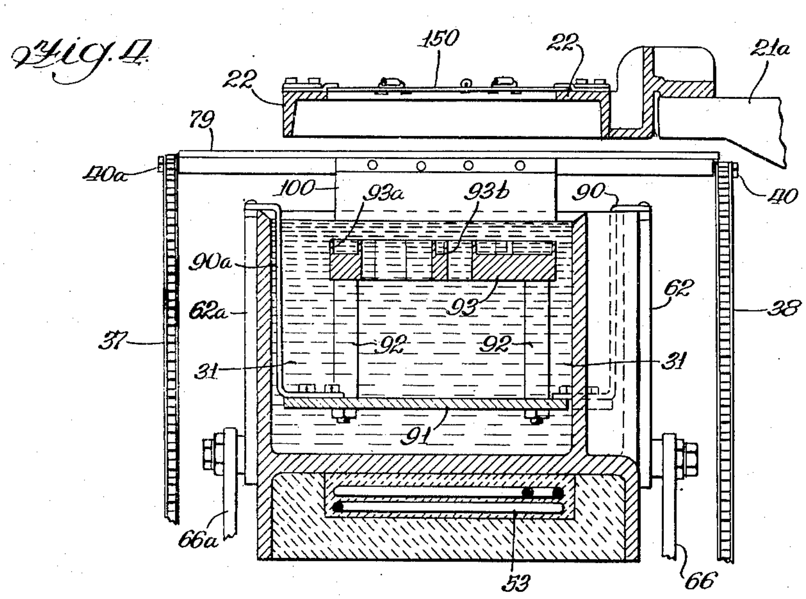
Fig. 4
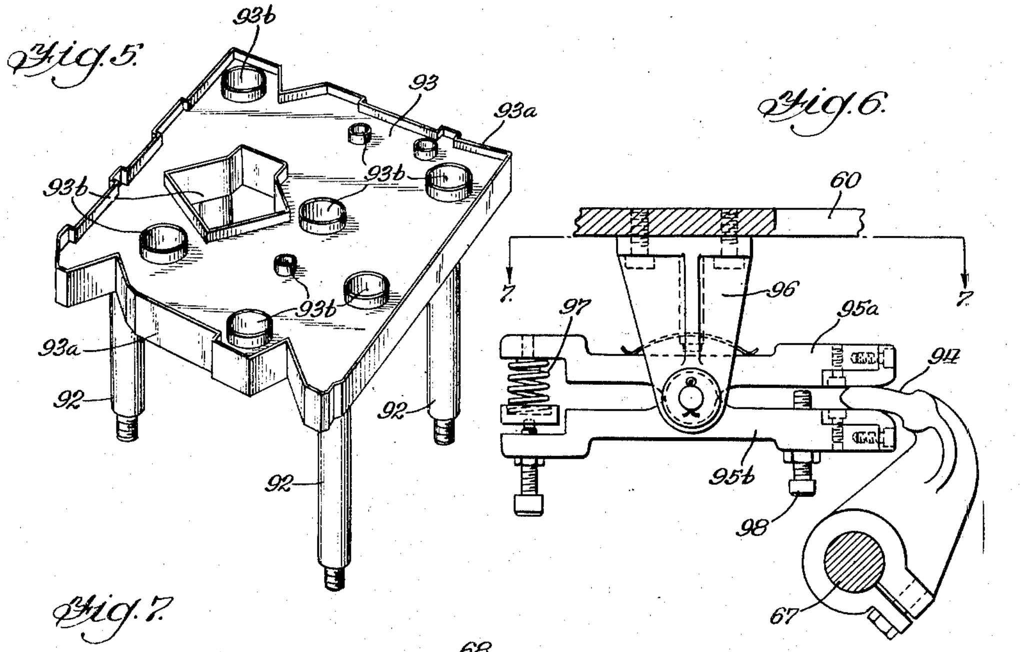
Fig. 5, Fig. 6, Fig. 7
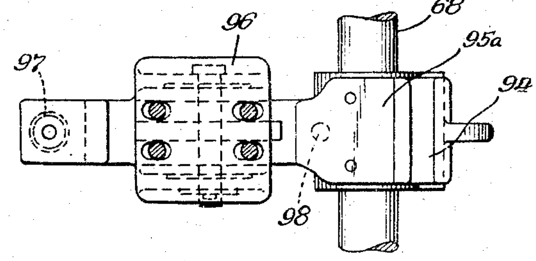
INVENTOR.
Jack J. Zimmerman
BY
Mueller & Aichele
Attys.

INVENTOR.
Jack J. Zimmerman
BY
Mueller & Aichele
Attys.

United States Patent Office 2,771,048

Patented Nov. 20, 1956

2,771,048

AUTOMATIC SOLDERING MACHINE

Jack J. Zimmerman, Riverside, Ill., assignor to Motorola, Inc., Chicago, Ill., a corporation of Illinois Application February 1, 1955, Serial No. 485,561

13 Claims. (Cl. 113—59)

The present invention relates to an improved mechanism for automatically providing selective soldering to the connecting junctions of electronic apparatus such as radio receivers, television receivers and the like; more particularly, the invention is concerned with such an improved mechanism for selectively soldering a plated circuit assembly.

In recent years, printed or plated circuit processes have been applied to electronic apparatus to improve and render more efficient the manufacturing process of such equipment. In accordance with printed circuit techniques, insulated panels are provided with a conductive design plated or otherwise formed directly on the panel, this design being used to replace the wire leads previously used to make the various connections. This plated circuit construction eliminates the many operations previously required in cutting and forming wire leads. Even with the plated circuit assemblies, however, the connections between various components and the circuit plated on the insulated panel must still be soldered. In the past, this soldering was carried out manually which added unduly to the manufacturing cost of the unit.

The plated circuit assembly does lend itself to dip soldering techniques, and this has been resorted to in some instances. However, even though dip soldering enables a plurality of connections to be simultaneously soldered for increased soldering speed, the process has several limitations since it applies solder to unwanted portions of the assembly which often results in bridging and in other undesired results.

In order to provide improved automatic soldering for plated circuit panel assemblies, and to overcome the limitations of dip soldering methods, applicant devised the machine and method disclosed and claimed in copending application 292,424, filed June 9, 1952. In the machine of that application, a series of elongated individual solder-carrying cups or members were mounted on an elevator in an upright position and immersed in molten solder. These cups were each in the form of a rod with a shallow depression at its upper end. The panels to be soldered were successively positioned directly over the molten solder container, and the solder-carrying members were raised to an elevated position to carry individual solder globules to local areas of the panel that required soldering.

Copending application 449,119, filed August 11, 1954, also in the name of the present inventor, disclosed a different type of automatic soldering machine but which also used a series of upright elongated solder cups to obtain soldering of localized points of the plated circuit panel.

Both the machines disclosed in the copending applications referred to above have been used satisfactorily. However, some difficulty has been encountered in maintaining the individual elongated solder-carrying members free from oxides which have a tendency to form between the members on the outer surface thereof after the machines have been in use, and which in time will clog the machine. It is chiefly with the solution of this problem that the present invention is concerned.

It is, accordingly, an object of the present invention to provide an improved automatic soldering machine for effecting selective soldering of a plated circuit panel assembly or the like.

Another object of the invention is to provide such a selective soldering machine, which is constructed so that the solder-carrying member therein is not subject to the deleterious effects of the formation of solder oxides thereon.

A feature of the invention is the provision of a single solder-carrying member in an automatic soldering machine whose upper surface is formed to support a solder meniscus and which has apertures therein that function to shield portions of the plated circuit on which no soldering is desired, the member having a surface composition that inhibits the formation of solder oxides thereon or in the apertures.

Another feature of the invention is the provision of a braking mechanism in such a machine to retard the approach and departure of the solder-carrying member to and from its soldering position, so as to maintain the solder meniscus as the member approaches the soldering position and to prevent solder bridging as the member departs from that position; it having been found that solder bridging is due, to a great measure, to the rapid removal of the solder-carrying member.

The above and other features of the invention which are believed to be new, are set forth with particularity in the appended claims. The invention itself, however, together with further objects and advantages thereof may best be understood by reference to the following description when taken in conjunction with the accompanying drawings in which:

Fig. 4 is a sectional view of a component of the machine taken along the lines 4—4 of Fig. 2;

Fig. 5 is an enlarged detailed view of the solder-carrying member of the machine;

Fig. 6 is an enlarged view of a braking mechanism included in the machine;

Fig. 7 is a view of the braking mechanism taken along the lines 7—7 of Fig. 6;

Figures 1, 1A:
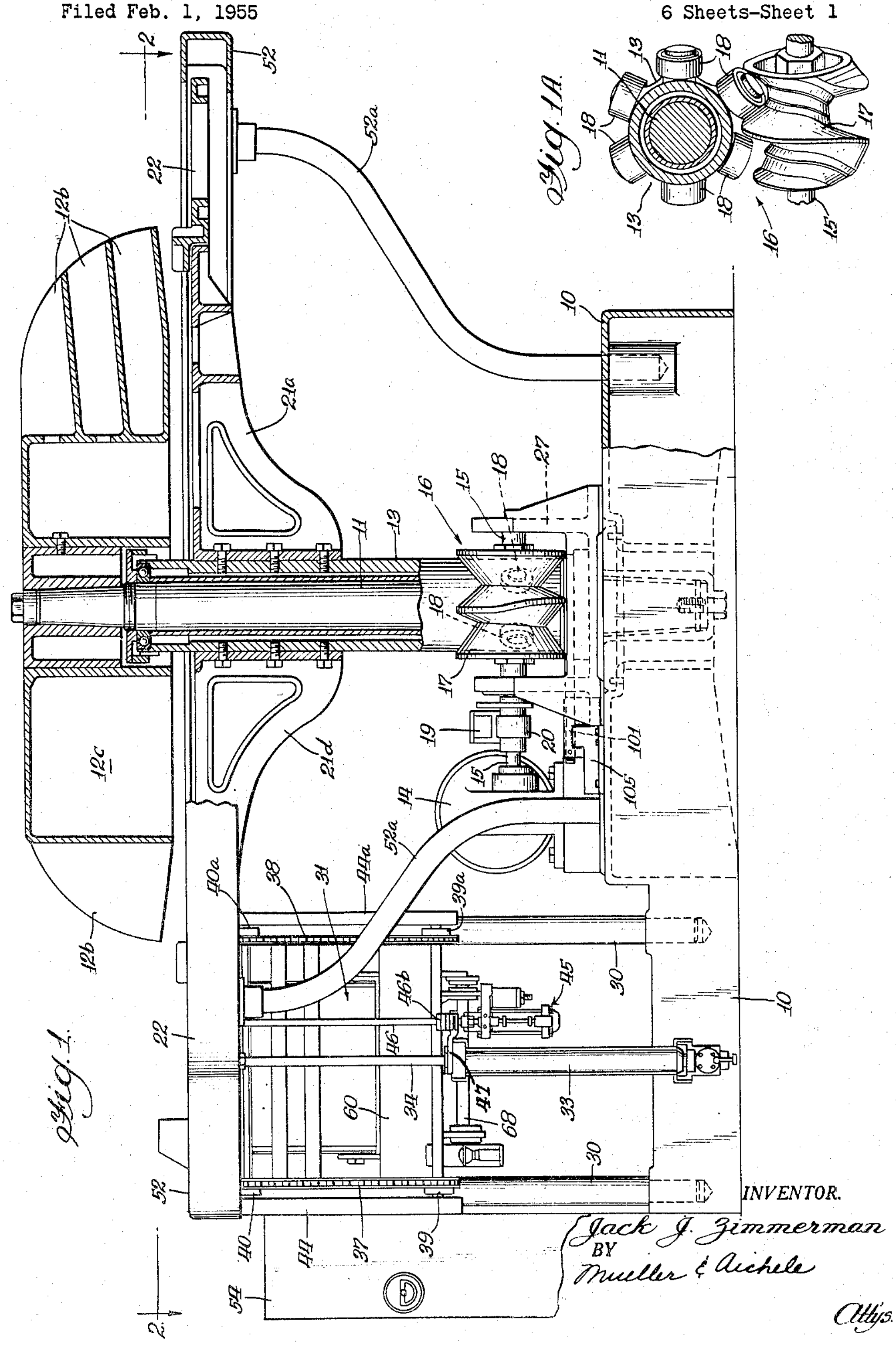
Fig. 1 is an elevational view, partly in section, of the improved automatic soldering machine of the invention.
Fig. 1A is a perspective view of certain components of the machine of Fig. 1.

The present invention provides a machine for selectively applying solder to metallic conductors supported on at least the underside of an insulated panel. The machine comprises a container for molten solder, and means for supporting the panel horizontally in a selected position over the container. A solder-carrying member is mounted in the container, and this member has an upstanding rim extending around its periphery to render the top surface of the member capable of carrying a solder meniscus. The solder-carrying member also has a series of apertures extending therethrough, with each of the apertures having an upstanding rim extending around its periphery. The rimmed apertures serve to shield selected portions of the underside of the panel from the solder meniscus. Means is provided for moving the solder-carrying member vertically between a first position below the surface of a quantity of molten solder in the container and a second position above the surface, with the solder meniscus being formed on the top surface as the solder-carrying member breaks the surface of the molten solder. Finally, means is provided for arresting the movement of the solder-carrying member at the second position with its top surface spaced a selected distance from the underside of the panel and with the solder meniscus in contact with the metallic conductors.

Many of the details of the machine illustrated in the drawings are similar to those of the machine disclosed in the copending application 449,119; and the description herein will be limited to that necessary for a clear understanding of the operation of the machine.

A stationary vertical spindle 11 is mounted on a base 10 and extends upwardly therefrom. A series of bins **12*b* are supported at the top of spindle 11 and extend radially outward therefrom to be positioned respectively at various stations to be described. A counterweight 12*c* for the bins is also supported by this spindle and is positioned over a solder station that will also be described. The purpose of the bins is to hold the various components that are to be inserted in the plated circuit panel assemblies at the various stations. A rotatable tubular spindle 13 is also supported by base 10, and the rotatable spindle extends upwardly from the base in coaxial relation with spindle 11** and surround the latter spindle.

A drive motor 14 is mounted on base 10, and the drive motor has a usual speed reducer and solenoid brake associated therewith. A horizontal drive shaft 15 extends from the speed reducer and is coupled to spindle 13 through a Ferguson three-dimensional cam drive assembly 16. The drive assembly is shown in Fig. 1*a*, and it comprises a cam 17 affixed to the drive shaft 15, and a plurality of disc-like cam followers 18 rotatably mounted around the periphery of spindle 13 on respective uniplanar radial axes of that spindle. The cam followers 18 are in the form of ball-bearing races secured to radially extending studs on the spindle.

Figure 1B:
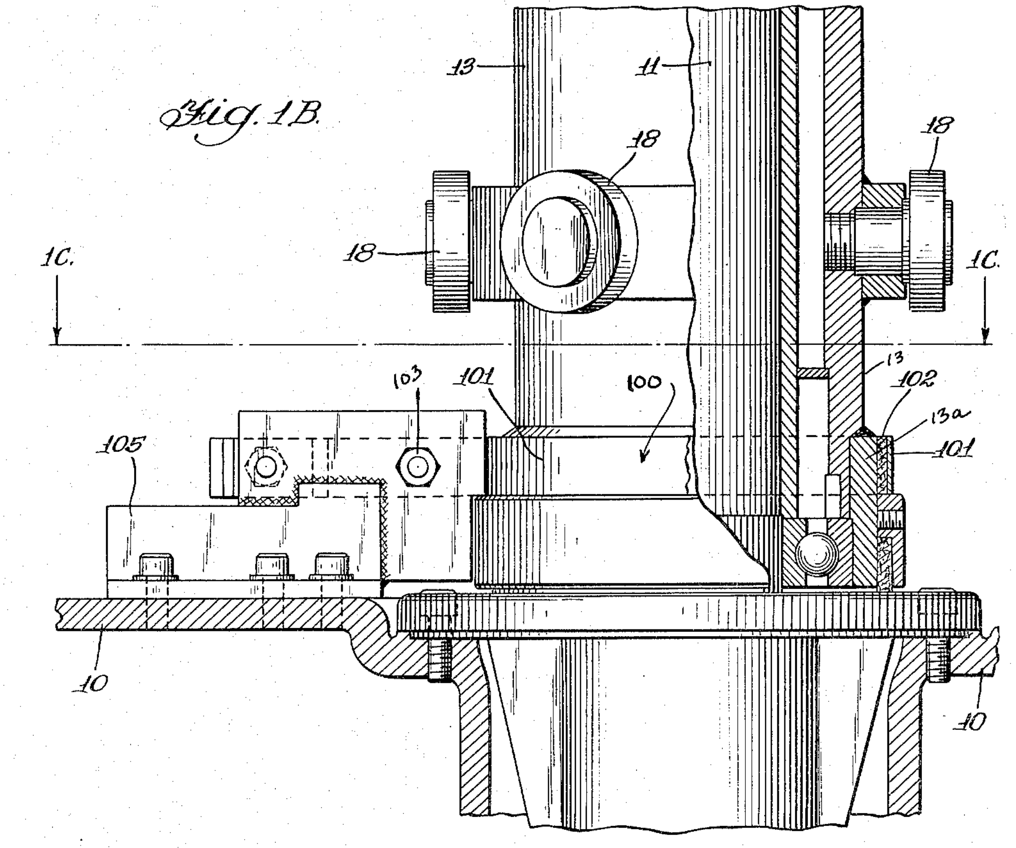
Fig. 1B is an elevational fragmentary view of a portion of the machine with various components removed to reveal a braking mechanism.
Figure 1C:
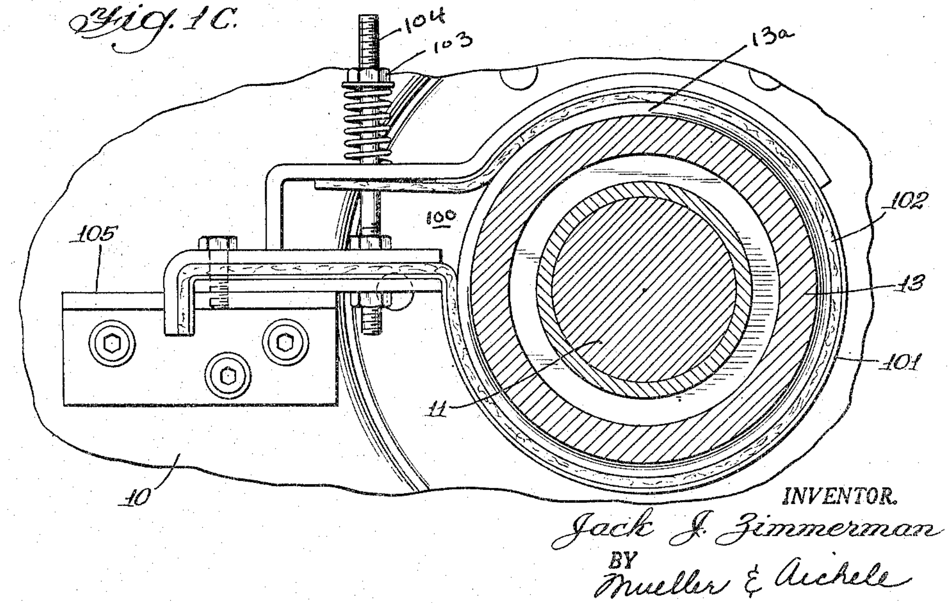
Fig. 1C is a view taken along the line 1C—1C of Fig. 1B.

The drive assembly is such that 270° rotation of drive shaft 15 produces a 60° rotation of spindle 13, and the remaining 90° rotation of the drive shaft is within a vertical dwell on cam 17 wherein spindle 13 remains at rest. Shaft 15 has a cam 20 mounted thereon, and this cam trips a limit switch 19 upon each revolution of the drive shaft and at the beginning of dwell period mentioned above. Tripping of the limit switch de-energizes motor 14 and actuates the solenoid brakes associated therewith to stop the motor. Since this takes place during the dwell interval, the angular position of the spindle 13 is determined by the drive assembly and is not dependent on the precision of the motor tripping circuit. Therefore, spindle 13 is stopped at the end of each 60° angular movement thereof, and its angular position at each stop is precisely fixed by the drive assembly. The drive assembly is constructed so that the width and angle of the surface of cam 17 pre-loads at least two of the cam followers 18 at the dwell position for rigid retention of spindle 13 in its set angular position. Shaft 15 is carried in eccentric bearing holders 27 secured to base 10, and cam 17 is tapered. This allows adjustment to be made to compensate for wear between the cam and the cam followers so as to maintain a condition of absolutely no play between the cam and the followers at the dwell positions. A drag brake 100 (Figs. 1B and 1C) is provided which includes a flexible resilient metal band 101, and an inner brake lining 102. These are wrapped around an enlarged portion **13*a* of spindle 13 and impart a frictional drag to the spindle which is adjustable by adjusting spring loaded nut 103 on stud 104. This brake holds a surface of the cam 17 against the cam followers further to maintain a condition of no play between the cam and cam followers, despite wear of these elements. The drag brake is supported on base 10 by means of a bracket 105** which is bolted thereto, with the brake being welded to the bracket.

Figure 2:
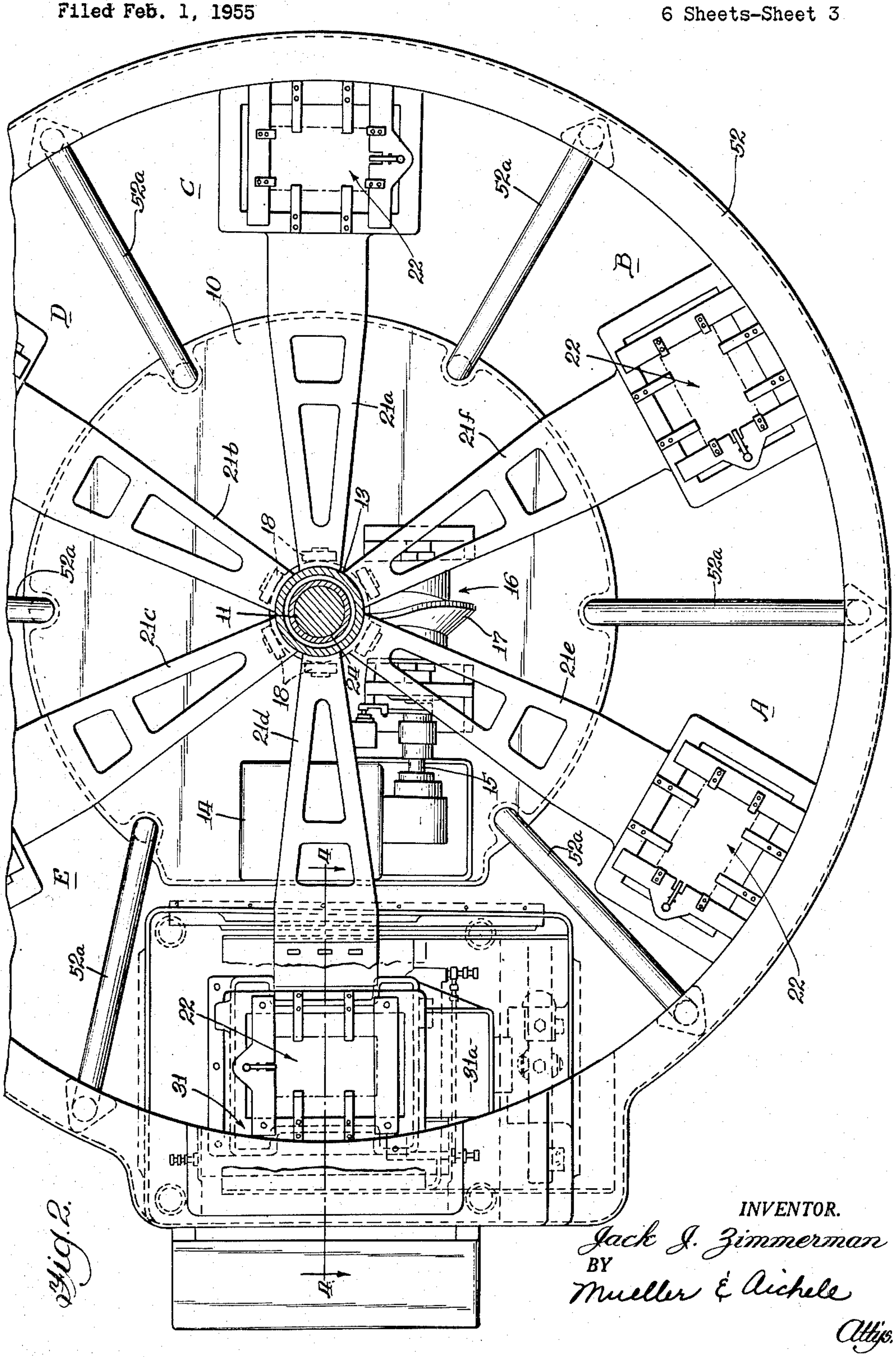
Fig. 2 is a top plan view of the machine, partly in section, taken along the lines 2—2 of Fig. 1.

As shown in Fig. 2, the machine includes six pallet arms **21*a*–21*f* which are affixed to the upper end of vertical spindle 13, and these arms extend radially outward from the vertical spindle at fixed angles with respect to one another. A corresponding series of panel-supporting members or pallets 22** are bolted to the free ends of the pallet arms. Each pallet may have a construction similar to that shown and described in the copending application 449,119, and it includes essentially a frame on which the plated circuit panel is supported over a central opening.

A molten solder container 31 is positioned at the soldering station under the plane of pallets 22, and this container receives the pallets successively as spindle 13 rotates, with each pallet being precisely positioned over the container during the arrested motion of spindle 13 in its successive dwell positions.

The pallets are surrounded by an annular guard rail 52 which is supported on base 10 by rods **52*a*. These pallets are precisely positioned over the molten solder container in succession as shaft 13** rotates, and this is accomplished by the Ferguson drive assembly in the manner previously discussed.

Assuming in Fig. 2 that the machine is rotating in a counterclockwise direction, it can be seen that there are six stations which are indicated "A," "B," "C," "D," "E" and "F." At station "A," for example, a soldered plated circuit panel from the solder station "F" is removed and a new panel is snapped in place on a pallet 22 as each pallet is arrested at that station. At stations "A," "B," "C," "D" and "E," various components to be supported on the panels are removed from bins **12*b* and appropriately positioned on each panel. At the solder station "F" over the solder container, the components are soldered to each plated circuit panel. As previously noted, the motion of pallet is intermittent, with energizing motor 14 being de-energized for each dwell interval of the cam assembly 16, so that the pallets are arrested for an appropriate interval at each station. That is, each revolution of drive shaft 15 rotates the spindle 60° so as to move the pallets from one station to the next. At each station the motor is stopped for a selected interval, and the spindle 13** is precisely positioned by the Ferguson drive assembly at each stop.

Figure 3:
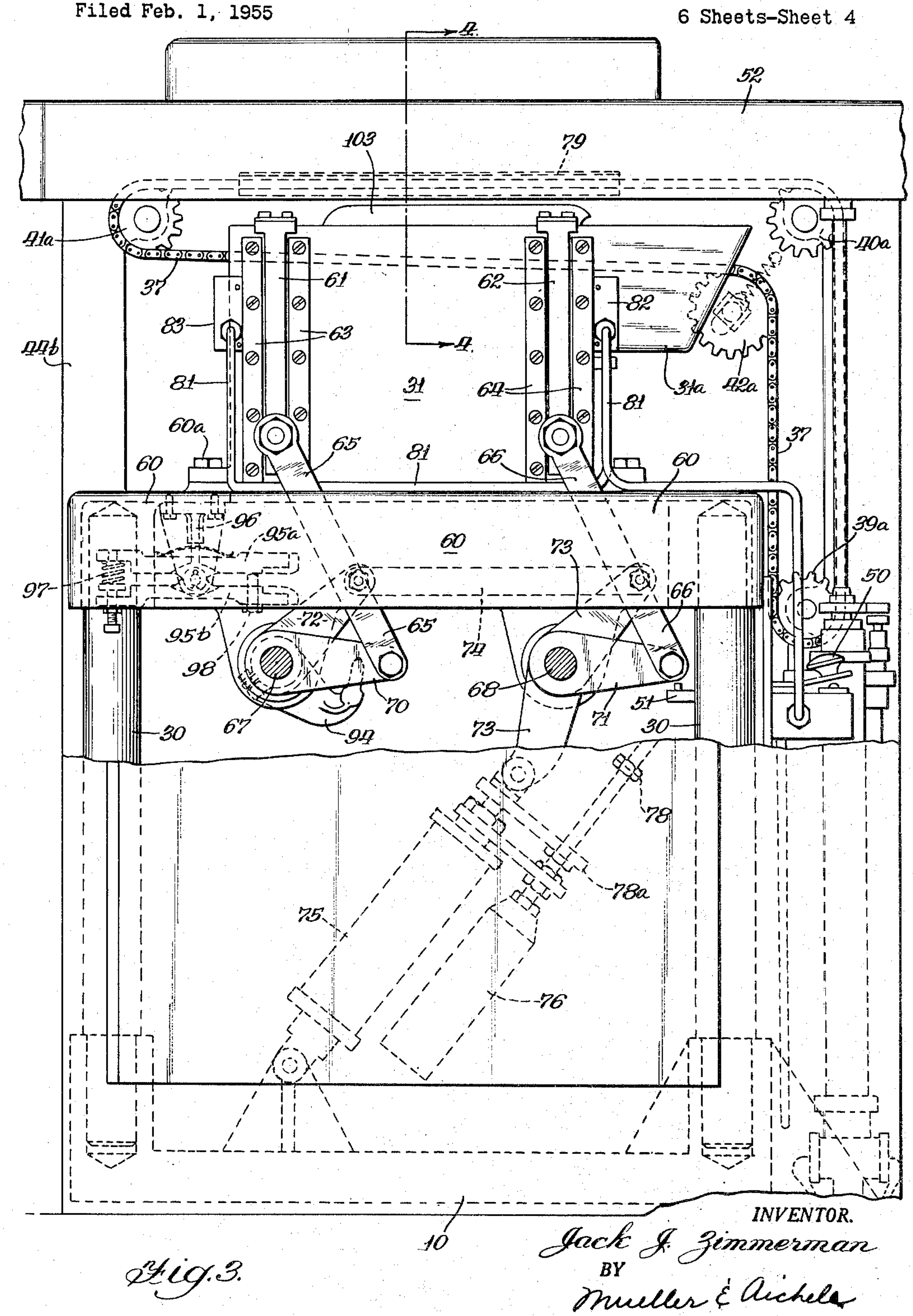
Fig. 3 is an enlarged elevational view of the machine looking from the left to the right of Fig. 1.

The solder container 31 is mounted on a base 60 which is supported on a series of supporting legs 30. Legs 30, in turn, are mounted on base 10. An air cylinder 33 is mounted on base 10 at one end of solder container 31, and the air cylinder includes a vertically extending piston 34. A cross arm is affixed to the upper end of piston 34 and extends horizontally at right angles to the piston. The cross arm is affixed to a pair of endless chains 37 and 38 that are supported in spaced parallel relation on a series of sprockets 39–42 and **39*a*–42*a*, respectively. The sprockets 39–42 are supported on a vertical supporting frame 44 and the sprockets 39*a*–42*a* are supported on a vertical supporting frame 44*a*, which frames are supported by horizontal base 60. As shown in Fig. 3, chain 37 extends vertically upward at one side of the assembly around sprockets 39*a* and 40*a*, and it then extends horizontally over the top of solder container 31 and to one side thereof over the sprocket 41*a*. The chain then return over sprocket 42*a* to sprocket 39*a*. Chain 38 has the same travel over sprockets 39–42 at the other side of the solder container. Sprockets 42 and 42*a*** are spring loaded to maintain the chain taut and yet not impede the travel thereof over the sprocket.

A hydrocheck 45 is mounted adjacent air cylinder 33 and is supported by the air cylinder by a bracket 47. The hydrocheck has a vertical piston 46 extending upwardly in spaced parallel relation with piston 34 of air cylinder 33, the upper end of piston 46 of the hydrocheck extending through the cross arm at the upper end of piston 34. The hydrocheck is cocked on the upstroke of piston 34, and it gradually slows down that piston at the lower end of its down stroke as the cross arm engages an adjustable nut **46*b* on piston 46**.

As more clearly shown in Fig. 3, the legs 30 support the horizontal base 60 which, in turn, supports the solder container 31. The container is bolted to the base by bolts such as **60*a* and 60*b*. A lifting mechanism is mounted within the solder container (see also Fig. 4), and this lifting mechanism includes a pair of vertical reciprocating spaced, parallel outer slide members mounted on opposite sides of the solder container, the pair of slide members on one side being designated 61, 62 and the pair of similar slide members on the opposite side being designated 61*a*, 62*a*. Slide members 61 and 62 are carried in respective guideways 63, 64 bolted to the container 31; and slide members 61*a*, 62*a* are carried in corresponding guideways 63*a*, 64*a*** on the opposite side of the solder container.

Slide members 61, 62 and **61*a*, 62*a* are arranged to be vertically reciprocated by the movement of a lever linkage, such a linkage for members 61, 62 being shown in Fig. 3. It is to be understood that a similar linkage is disposed at the opposite side of the container to actuate slide members 61*a*, 62*a***.

The linkage shown in Fig. 3 includes a pair of connecting arms 65, 66; these arms being pivoted to the respective lower ends of slide members 61, 62. A pair of transverse pivot shafts 67, 68 is mounted below base 60 in spaced parallel relation, and these shafts cross at right angles the respective axes of sliding members 61, 62 and **61*a*, 62*a* respectively. A pair of crank arms 70, 71 are respectively affixed to shafts 67 and 68, with the free ends of these crank arms being respectively pivoted to the lower ends of connecting arms 65, 66. A crank arm 72 and a bell crank 73 are respectively affixed to shafts 67, 68; the latter crank arm and bell crank being axially spaced along the shaft from crank arms 70, 71 and angularly displaced in a counterclockwise direction by a selected angle therefrom. A horizontal connecting rod 74 is pivoted to and connects the free ends of crank arm 72 and bell crank 73**.

An air cylinder 75 is angularly mounted on base 10 below base 60, and the piston of the air cylinder is pivoted to the opposite end of bell crank 73. A hydrocheck 76 is supported by air cylinder 75, and the hydrocheck has a stop member 78 on its piston that is struck by a limit bracket **78*a* supported by the piston of air cylinder 75** when the latter piston nears the end of its outward stroke. In this manner, the hydrocheck brings the air cylinder piston to a slow stop at the termination of its outward stroke for reasons to be described.

The upper ends of slide members 61, 62 and **61*a*, 62*a* are secured to corresponding brackets 90, 90*a* (Fig. 4) which extend downwardly into container 31 essentially parallel to the respective slide members. The lower ends of brackets 90 are secured to a platform 91. A series of vertical studs 92 are mounted on platform 91 and these studs support a plate-like solder-carrying member 93 at their upper ends in spaced parallel relation with the platform. The actual configuration of the solder-carrying member 93 will be described in detail hereinafter. For present purposes, it is sufficient to state that this member is moved by platform 91 from a position below the level of molten solder in container 31 to a position above the surface of the molten solder, with the member carrying a solder meniscus upwardly into selective soldering contact with a plated circuit panel 150 supported by a pallet 22** positioned over the solder container.

The electric coils 53 for heating the solder container 31 are also shown in Fig. 4, and these coils maintain the solder in the container in a molten condition.

The assembly also includes a braking mechanism shown in Figs. 3, 6 and 7. This braking mechanism includes a tongue 94 that is rotatably mounted on shaft 67 and affixed thereto as is crank 72. A pair of jaws **95*a*, 95*b*, having suitable brake lining material mounted on their facing surfaces, and pivotally mounted on a bracket 96, which bracket is affixed to the underside of base 60. The jaws 95*a*, 95*b* are spring loaded by a compression spring 97 and held with an initial pre-set separation by a setscrew 98. Rotation of shaft 67 in a counterclockwise direction causes the tongue to enter between jaws 95*a*, 95*b*; and these jaws slow down the angular rotation of the tongue and of shaft 67 to a decreased speed just prior to the end of travel thereof. This decreased speed is dependent on the air pressure in cylinder 75 and on the adjustment of spring 97. On subsequent clockwise rotation of shaft 67, the initial departure of tongue 70 at the same slowed speed due to the friction afforded by jaws 95*a*, 95*b***. The significance of the braking mechanism will be more evident as the description proceeds.

The piston of cylinder 75 on its outward stroke rotates linkage mechanism 73, 71, 66, 74, 72, 70 and 65 in a counterclockwise direction; and this causes connecting arms 65, 66 to move slide members 61, 62 from a lower position to an upper position. A similar action is imparted through the linkage mechanism on the other side of solder container 31 to the slide members **61*a*, 62*a*. This movement of the slide members moves platform 91 from its lower position to its upper position, and this causes the top surface of solder-carrying member 93 to break through the surface of the molten solder in container 31 and move upward to its solder contact position. It has been found that the formation of such a solder meniscus on the solder-carrying member is dependent upon the rapidity with which the top surface of the member breaks the surface of the molten solder. The linkage mechanism between the air cylinder 75 and slide members 61, 62 and 61*a*, 62*a* is arranged to impart a high speed to the solder-carrying member on its upward thrust until the surface of the molten solder is broken by the top surface thereof, and then to provide a gradual decreasing speed as the member approaches its solder contact position so that the meniscus is retained and splashing is avoided. This is achieved by the arrangement of Fig. 3 in which the crank arms 70, 71 are disposed essentially horizontal, for maximum vertical motion translation thereby to the vertical slide members 61, 62, when platform 91 is in its lowermost position. The rapid vertical thrust to the sliding members 61, 62 continues for the initial portion of the swing of crank arms 70 and 71 in a counterclockwise direction from the horizontal. However, as the elevator reaches its upper position, crank arms 70, 71 approach a vertical position with less vertical motion being translated thereby to the vertical sliding members 61, 62**.

Toward the end of the outward motion of the piston of air cylinder 75, the limit bracket **78*a* engages stop 78 on hydrocheck 76 to slow the outward motion of the piston of air cylinder 75 at the point tongue 94 enters jaws 95*a*, 95*b*. This causes the solder-carrying member 93 to approach the underside of the insulated panel at reduced speed. At this point, the braking mechanism also comes into play as tongue 94 enters between jaws 95*a*, 95*b* with the spring bias of these jaws assisting in reducing the speed of member 93 so as to retain the solder meniscus on the top surface of that member when it finally reaches its soldering position. This action allows the transfer of heat to the plated circuit assembly starting an alloying action and the use of the solder. As the solder-carrying member reaches its final upward stroke, the rims of apertures 93*b* contact the underside of the panel and mask portions therefor, as will be described. It should be noted at this point that it has been found that solder bridging occurs between adjacent portions of the plated circuit when the solder-carrying member is withdrawn too quickly after performing its soldering function from the underside of the plated circuit assembly. Such rapid departure is prevented by the braking mechanism, since the return stroke of air cylinder 75 is initially retarded by the braking mechanism, and this retardation continues until tongue 94 frees itself from jaws 95***a*, 95*b*, at which time the speed can increase rapidly to reduce the working cycle as much as possible.

Suitable lubrication to the high temperature sliding members 61, 62 and 61*a*, 62*a* is provided by tubes 81 which supply air under pressure to powdered lubricant reservoirs 82, 83 upon actuation of key 50. This lubrication system is fully described in copending application 449,119 referred to previously herein, and as noted in that application powdered lubricant such as molybdenum disulphide is satisfactory for withstanding the high temperatures. This powdered lubricant is blown into the areas to be lubricated from reservoirs 82, 83 upon depression of key 50.

As shown in Figs. 3 and 4, a rigidized aluminum cover 79 is affixed to chains 37, 38 and this cover is movable by the chains from a closed position in which it completely closes the open top of container 31, to an open position in which the interior of the container is exposed. The chains themselves are supported in appropriate tracks across the top of the solder container 31 to prevent sagging. The opening and closing of the cover is controlled by the air cylinder 33 shown in Fig. 1, this air cylinder being synchronized with the drive of the pallet 22 so that its piston moves to open the cover when a pallet is positioned over the solder container, and so that its piston moves to close the cover at the completion of the soldering operating when the solder-carrying member 93 in container 31 is dropped to its lower position.

A wiper 100 is pivoted to the chain 37, 38 and this wiper moves with the cover across the surface of the molten solder in container 31 upon actuation of the chains by air cylinder 33 so as to remove surface oxides from the solder and deposit such oxides in a waste bin 31*a* as the cover is opened, the bin being mounted on one end of container 30. The purpose of hydrocheck 45 (described previously) is to slow down the chain motion as wiper 100 approaches the side of the solder container at the termination of its wiping stroke to prevent splashing of the solder which adheres to the wiper as the oxide is deposited in bin 31*a*.

As previously noted, earlier automatic soldering machines of this general type utilized a series of elongated cups as solder-carrying members, and some difficulty was experienced in maintaining these cups free from the accumulation of solder oxides therebetween. This factor is eliminated in the present invention by the replacement of the cups by the plate-like solder-carrying member 93 which is shown in detail in Fig. 5. Member 93 has an upstanding rim 93*a* extending around the periphery thereof to render the top surface of this member capable of carrying a solder meniscus as the member breaks through the surface of molten solder within container 31. The solder-carrying member 93 also has a series of apertures 93*b* extending therethrough, each with an upstanding rim extending around the periphery thereof. These apertures may be circular or have any irregular configuration that is desired, and as is shown in Fig. 5, and the rimmed apertures 93*b* serve to shield selected portions of the underside of the insulated panel from the solder meniscus on the top surface of member 93.

Figure 8:
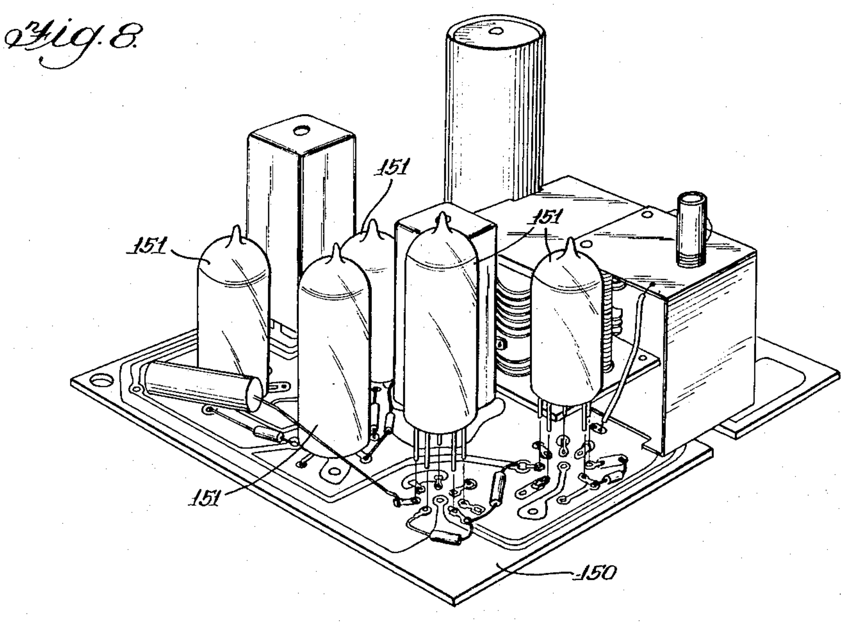
Fig. 8 is a perspective view of a plated circuit panel assembly with various components supported thereon to constitute the chassis of a radio receiver.
Figure 9:
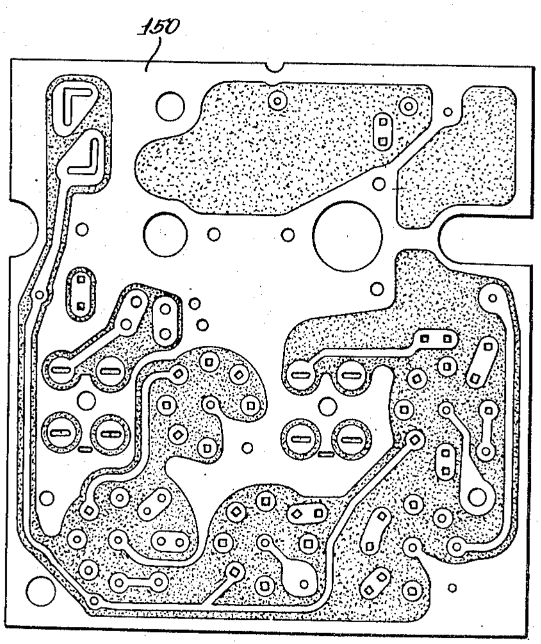
Fig. 9 is a bottom view of the plated circuit assembly of Fig. 8.

A typical plated circuit panel assembly to be supported by a pallet 22 over the solder container 31 is shown in Fig. 9 as panel 150. Both sides of the insulated panel 150 have electrical conductors plated thereon in a selected circuit design, and such conductors are connected through plated eyelets in the insulated panel. Various components are supported on the panel, such as shown in Fig. 8, and these components have electrical connectors which extend into the metal eyelet and which are to be soldered to the conductors by the automatic soldering machine of the invention. It is desirable that certain portions of the conductive design be shielded from solder contacts, and this is achieved (as previously noted) by the rimmed apertures 93*b* of the solder-carrying member. For example, certain portions of the panel represent sockets for the electron discharge devices 151 of Fig. 8, and it is necessary that such portions be shielded. Moreover, it is evident that other portions, likewise, must be shielded such as adjustment access holes, mounting holes, etc., and this is achieved by the rimmed apertures.

Therefore, on the upward stroke of solder-carrying member 93, it first breaks through the surface of molten solder in container 31, and a solder meniscus is formed on the top surface. Excess solder immediately runs down the sides and through the apertures, and the member is composed of a solder wetting material such as low alloy low carbon steel, and the small amount of oxides that form on its sides or in its apertures is not detrimental to its operation. As the top surface of member 93 approaches its solder position beneath the underside of panel 150, it is slowed down to a decreased speed by the braking mechanism and by hydrocheck 76 in the manner previously described. The member 93 approaches the underside of the plated circuit panel at this decreased speed, with the solder meniscus in contact with conductors on the panel and any projections emanating therefrom, and heating with resulting alloying action and use of the solder takes place before it has a chance to be sloughed off the top surface of member 93. The slowed speed affords the necessary time for the solder from the meniscus to flow to all metal parts, except those shielded by the apertures 93*b* whose rims contact the underside of the panel. Moreover, the meniscus of the solder-carrying member by alloying action flows up the various metal plated apertures in panel 150 and fills the apertures. At the same time, heat is transferred to the insulated panel which vaporizes a flux coating that is usually applied thereto. This draws the solder to all adjoining metal surfaces of both the upper and lower surfaces of these panels. When the solder-carrying member is withdrawn, the braking action described previously causes this withdrawal to be carried out slowly so as to overcome any tendency for solder bridging. This slowed action permits the heat to still be convected from member 93 to the panel so that the solder is maintained in a molten condition long enough to permit the surface tension of the solder to provide the solder into independent islands on each metal surface to prevent freezing while it extends across the insulated panel from one metal conductor to the next.

The top surface of member 93 is spaced from the supported panels when in its soldering position, and this permits these panels conveniently to be positioned in succession thereover by the pallets without the need for any dipping motion or the like. Moreover, the fact that the meniscus only contacts the insulated panel permits the prevention of bridging as discussed above which is not possible with dip soldering.

To reiterate the operation of the machine, energization of motor 14 (Fig. 1) produces intermittent rotation of pallet arms 21 (Fig. 2) and the pallets 22 supported thereby. Such intermittent rotation of the pallets causes them to be successively positioned precisely over the solder container 31, with the motor being de-energized for a selected interval upon such successive positioning of the pallets. Upon the positioning of a pallet over the solder container and subsequent de-energization of motor 14, air cylinder 33 (Fig. 1) is operated which causes chains 37, 38 to open cover 79 and to move wiper 100 across the surface of the molten solder so that oxides are removed and deposited in bin 31. Air cylinder 75 (Fig. 3) is then actuated to move platform 91 and, therefore, solder-carrying member 93 from its lower position to its upper position, this being vertical. The top surface of the solder-carrying member quickly breaks the surface of the molten solder to form a meniscus thereon with excess solder running down the sides and down the rimmed apertures of this member. The meniscus is carried into soldering contact with the conductors on the underside of the plated circuit panel rigidly supported by the pallet, and the rims 93*a* and the rims of apertures 93*b* contact the panel to shield certain portions thereof from soldering action. At this point, it should be noted that rim 93*a* is contoured to afford masking for borders, mounting holes, and the like, that need be metallized yet must remain free from solder which would otherwise clog holes and the like. After a selected time interval air cylinder 75 is actuated to retract platform 91 and solder-carrying member 93 to its lower position. The approach of the solder-carrying member to its soldering position and the departure of that member from its soldering position are slowed down by the braking mechanism described previously and for the aforementioned reasons. Air cylinder 33 is then actuated to close the cover and to return wiper 100 to its initial position. Motor 14 is then energized to rotate pallet 22 and bring another panel into position over the solder container so that the operation may be repeated.

Any suitable manual or automatic control system for carrying out the operation described above can be used. For example, the control system described in detail in the copending application 449,119 is well suited for this purpose.

The invention provides, therefore, an improved automatic soldering machine for effecting selective soldering to the conductors and metal eyelets of a plated circuit panel. The machine is relatively simple in its construction, and operates with a high degree of satisfaction and without encounering serious solder oxidizing problems in its solder applicating components.

I claim:

1. In a machine for applying solder to selected areas on the underside of a printed circuit panel comprising a thin insulated panel having a circuit pattern of thin metal conductors on a side thereof and having selected parts which must not be contacted with solder, and which includes a container for molten solder, conveyor means having a panel supporting portion and movable to hold a printed circuit panel horizontally in a selected position over the molten solder container; a solder-carrying tray positioned in said container, means to move said solder-carrying tray upwardly in said molten solder container from below the surface of a quantity of molten solder therein to a position adjacent the underside of the printed circuit panel to carry a quantity of molten solder for selective soldering of the underside of the printed circuit panel, said solder-carrying tray being of a size and shape operable to carry solder for contacting substantially the entire underside of the panel, and said solder-carrying tray having an aperture therein with an upstanding rim extending around the periphery thereof, said aperture and rim being adapted to be aligned with a selected part of a panel positioned thereover which must not be contacted with solder and thereby providing a selected surface configuration for solder in said tray for contact with selected areas on the underside of the panel.

2. In a machine for applying solder to selected areas on the underside of a printed circuit panel comprising a thin insulated panel having a circuit pattern of thin metal conductors on a side thereof and having selected parts which must not be contacted with solder, and which includes a container for molten solder, conveyor means having a panel supporting portion and movable to hold a printed circuit panel horizontally in a selected position over the molten solder container; a solder-carrying tray positioned in said molten solder container, means to move said solder-carrying tray upwardly in said container from below the surface of a quantity of molten solder therein to a position adjacent the underside of the printed circuit panel to carry a quantity of molten solder for selective soldering of the underside of the panel, said solder-carrying tray having an aperture therein with an upstanding rim extending around the periphery thereof, said aperture and rim being adapted to be aligned with a selected part of a panel positioned thereover which must not be contacted with solder and thereby providing a selected surface configuration for solder in said tray for contact with corresponding selected areas on the underside of a panel positioned thereover, and means cooperable with said tray-moving means to effect a substantially slower movement of said tray during a selected range of movement prior to contacting the solder with the underside of the panel and to effect a correspondingly slow movement of said tray during a selected range of movement during withdrawal from soldering contact, said last named means preventing the splashing of solder upon contact with the panel and preventing the drawing out of strings of solder upon withdrawal of the tray from soldering contact with the panel.

3. The combination of claim 2 in which said tray moving means includes a platform horizontally disposed within the container, and a series of vertical studs mounted on said platform for supporting said solder-carrying tray in spaced parallel relation with said platform.

4. In a machine for applying solder to selected areas on the underside of a printed circuit panel comprising a thin insulated panel having a circuit pattern of thin metal conductors on a side thereof and having holes therethrough with metal therein and having selected parts which must not be contacted with solder, and which includes a container for molten solder, conveyor means having a panel supporting portion and movable to hold a printed circuit panel horizontally in a selected position over the molten solder container; a solder-carrying tray movably positioned in said molten solder container, said solder-carrying tray having a plurality of apertures extending therethrough each with an upstanding rim extending around the periphery thereof, said apertures and rims being respectively adapted to be aligned with parts of a panel positioned thereover which must not be contacted with solder and thereby providing a selected surface configuration for solder in said tray for contact with corresponding selected areas on the underside of the panel, means for moving said solder-carrying tray upwardly from a first position below the surface of a quantity of molten solder in said container to carry a quantity of molten solder toward the underside of the panel, and means for arresting the movement of said solder-carrying tray at a second position adjacent the underside of a printed circuit panel positioned thereover with the surface of the solder in said tray in contact with selected areas including metal conductors and metal-containing holes on the underside of the printed circuit panel.

5. The combination of claim 4 in which there is provided means cooperable with said tray-moving means to effect a substantially slower movement of said tray during the final approach to and initial withdrawal from said second position so that said tray is stopped at said second position without splashing molten solder and withdrawn from said second position at a rate sufficiently slow to prevent the formation of strings of solder hanging from the soldered points on the panel.

6. In a machine for applying solder to the underside of a printed circuit panel comprising a thin insulated panel having a circuit pattern of thin metal conductors on a side thereof and having selected parts which must not be contacted with solder, and which includes a container for molten solder, conveyor means having a panel supporting portion and movable to hold a printed circuit panel horizontally in a selected position over the molten solder container; a solder-carrying tray positioned in said molten solder container, means to move said solder-carrying tray upwardly in said container from below the surface of a quantity of molten solder therein to a position adjacent the underside of a printed circuit panel positioned thereover to carry a quantity of molten solder into contact with the underside of the printed circuit panel while maintaining an upwardly projecting solder surface on said tray, and means cooperable with said tray-moving means to effect a substantially slower movement of said tray during a selected range of movement prior to contacting the solder with the underside of the panel and to effect a correspondingly slow movement of said tray during a selected range of movement during withdrawal from soldering contact, said last named means preventing the splashing of solder upon contact with the panel and preventing the drawing out of strings of solder upon withdrawal of the tray from soldering contact with the panel.

7. In a machine for applying solder to the underside of a printed circuit panel comprising a thin insulated panel having a circuit pattern of thin metal conductors on a side thereof, including in combination, a container for molten solder, conveyor means including a vertically extending supporting member, means supporting said vertically extending member for rotary movement about a vertical axis, means secured on said vertically extending member and including a plurality of portions for supporting a plurality of panels equally spaced angularly thereabout and operable to position a panel horizontally in a selected position over the molten solder container, a cam follower on said vertically extending member, a rotary cam engagable with and operable to move said cam follower to rotate said vertically extending member, said cam being operable upon predetermined rotation to rotate said vertically extending member through the distance between adjacent panel supporting portions, brake means cooperable with said vertically extending member to resist rotation thereof sufficiently to maintain said cam follower continuously in contact with said cam, a solder-carrying tray positioned in said container, means to move said solder-carrying tray progressively upward in said container from below the surface of molten solder therein to a position adjacent the underside of a printed circuit panel positioned thereover to carry a quantity of molten solder including an upwardly projecting solder surface into contact with the underside of the printed circuit panel.

8. A machine for applying solder to the underside of a printed circuit panel comprising a thin insulating panel having a circuit pattern of thin metal conductors on a side thereof, including in combination, a container for molten solder, rotatable supporting means having a plurality of panel supporting portions thereon spaced at equal angular distances therearound, said supporting portions each being adapted to have a printed circuit panel removably positioned therein for assembly of electrical components thereon and for soldering thereof, a cam follower on said rotatable supporting means, a rotary cam engagable with and operable to move said cam follower to rotate said supporting means and operable upon predetermined rotation to rotate the same through the distance between adjacent panel supporting portions, means to rotate said cam intermittently to provide selected intervals of rest and of movement for said rotatable supporting means, said cam being rotated through said predetermined rotation during each interval of movement, brake means cooperable with said supporting means to resist rotation thereof sufficiently to maintain said cam follower continuously in contact with said cam, one of said panel supporting portions being positioned to hold a printed circuit panel over said molten solder container during each interval of rest, solder-carrying means movably positioned in said container, and means to move said solder-carrying means progressively upward in said container from below the surface of molten solder therein to a position adjacent the underside of a printed circuit panel positioned thereover to carry a quantity of molten solder including an upwardly projecting solder surface into contact with the underside of the printed circuit panel.

9. A machine for applying solder to the underside of a printed circuit panel comprising a thin insulated panel having a circuit pattern of metal conductors on a side thereof; including in combination, a container for molten solder, a rotary conveyor including a vertically extending supporting member, means supporting said vertically extending member for rotary movement about a vertical axis, supporting means having a plurality of supporting portions equally spaced angularly thereabout and secured to said vertically extending member and rotatable therewith, means on each of said supporting portions for securing a panel thereon, said supporting means being movable to position a panel horizontally in a selected position over the molten solder container, a plurality of equally spaced radially extending cam followers on said vertically extending member equal in number to said panel supporting portions, a helically shaped cam engageable successively with said cam followers to rotate said vertically extending member, said cam having an indexing portion operable upon a first predetermined range of rotation to rotate said vertically extending member the distance between adjacent cam followers, said cam having a dwell portion which is operable upon a second predetermined range of rotation to hold one of said cam followers in a fixed angular position such that said supporting means is positioned with one of said panel supporting portions in said selected position over the solder container, brake means cooperable with said vertically extending member to resist rotation thereof to maintain said cam continuously in contact with one of said cam followers, a solder-carrying tray positioned in said container, means to move said solder-carrying tray progressively upward in said container from below the surface of molten solder therein to a position adjacent the underside of a printed circuit panel positioned thereover to carry molten solder having an upwardly projecting surface into contact with the underside of the printed circuit panel.

10. In a machine for applying solder to selected areas on the underside of a printed circuit panel which comprises a thin insulated panel having a circuit pattern of thin metal conductors on a side thereof and having selected parts which must not be contacted with solder, and which includes a container for molten solder, movable conveyor means, a panel supporting portion on said conveyor means and movable thereby to hold a printed circuit panel horizontally in a selected position over the molten solder container; a solder-carrying tray positioned in said container, means to move said tray upwardly in said container from below the surface of the solder therein to carry a quantity of solder having an upwardly projecting surface for selectively soldering the underside of the printed circuit panel, said tray having an outer rim and bottom wall operable to support solder having a surface of substantially the same shape and area as the panel, said bottom wall having a plurality of apertures therein with upstanding rims around the peripheries thereof terminating in a common plane with said outer rim, said apertures and peripheral rims being small in size relative to said tray and being adapted to be aligned with selected parts of the underside of a printed circuit panel positioned thereover which must not be contacted with solder and thereby providing a selected surface configuration for solder in said tray for contact with selected areas on the underside of the panel, and said tray-moving means being operable to move said tray to a position adjacent the underside of a panel positioned thereover with the solder surface in contact with the panel.

11. A machine for applying solder to parts of the surfaces of successive ones of printed circuit panels adapted to be movably carried in the machine from one work station to another with each panel comprising a thin insulated member with a circuit pattern of thin metal conductors on a side thereof and having selected parts which must not be contacted with solder, said machine including a container for molten solder, rotary conveyor means having a plurality of supporting portions spaced at equal angular distances around the circumference and adjacent the outside thereof with the supporting portions adapted to be stopped at work positions for the machine, said supporting portions each being adapted to have a printed circuit panel removably positioned thereon for assembling electrical components thereon and for soldering of the components thereto, a plurality of cam follower members on said conveyor means equal in number to said panel supporting portions and equally spaced angularly thereabout, a rotary cam engageable with and operable to move successive ones of said cam follower members to rotate said conveyor means, means to rotate said cam intermittently to provide a selected interval of rest and a selected interval of rotation sufficient to rotate said conveyor means through the distance between adjacent supporting portions, said conveyor means being positioned with successive ones of said supporting portions and panels carried thereon supported in a position horizontally over said container during each successive interval of rest, a solder-carrying tray positioned in said container, means to move said solder-carrying tray upwardly in said molten solder container from below the surface of a quantity of molten solder therein to a position adjacent the underside of the printed circuit panel to carry a quantity of molten solder for selective soldering of the underside of the printed circuit panel, said solder-carrying tray being of a size and shape operable to carry solder for contacting substantially the entire underside of the panel, and said solder-carrying tray having an aperture therein with an upstanding rim extending around the periphery thereof, said aperture and rim being adapted to be aligned with a selected part of a printed circuit panel positioned thereover which must not be contacted with solder and thereby providing a selected surface configuration for solder in said tray for contact with corresponding areas on the underside on the panel.

12. A machine for applying solder to parts of the surfaces of successive ones of printed circuit panels adapted to be movably carried in the machine from one work station to another with each panel comprising a thin insulated member with a circuit pattern of thin metal conductors on a side thereof and having selected parts which must not be contacted with solder, said machine including a container for molten solder, rotary conveyor means having a plurality of supporting portions spaced at equal angular distances around the circumference and adjacent the outside thereof with the supporting portions adapted to be stopped at work positions for the machine, said supporting portions each being adapted to have a printed circuit panel removably positioned thereon for assembling electrical components thereon and for soldering of the components thereto, an annular guard rail of channel-shaped cross section extending around the circumference of and partially enclosing the outer portions of said rotary conveyor means, means to rotate said conveyor means intermittently to position successive ones of said supporting portions and the panels carried thereon horizontally over said molten solder container, a solder-carrying tray positioned in said molten solder container, means to move said solder-carrying tray upwardly in said container from below the surface of a quantity of molten solder therein to a position adjacent the underside of the printed circuit panel to carry a quantity of molten solder for selective soldering of underside of the panel, said solder-carrying tray being of a size and shape operable to carry solder for contacting substantially the entire underside of the panel, and said solder-carrying tray having an aperture therein with an upstanding rim extending around the periphery thereof, said aperture and rim being adapted to be aligned with a selected part of a printed circuit panel positioned thereover which must not be contacted with solder and thereby providing a selected surface configuration for solder in said tray for contact with selected areas on the underside of the printed circuit panel.

13. A machine for applying solder to parts of the surface of successive ones of printed circuit panels adapted to be movably carried in the machine from one work station to another with each panel comprising a thin insulated member with a circuit pattern of thin metal conductors on a side thereof and having selected parts which must not be contacted with solder, said machine including a container for molten solder, a rotary conveyor means having a plurality of supporting portions spaced at equal angular distances around the circumference and adjacent the outside thereof with the supporting portions adapted to be stopped at work positions for the machine, said supporting portions each being adapted to have a printed circuit panel removably positioned thereon for assembly of electrical components thereon and for soldering of the components thereto, a plurality of cam follower members on said conveyor means in number to said panel supporting and equally spaced angularly thereabout, a rotary cam engagable with and operable to move successive ones of said cam follower members to rotate said conveyor means, means to rotate said cam intermittently to provide a selected interval of rest and a selected interval of rotation sufficient to rotate said conveyor means through the distance between adjacent panel supporting portions, said conveyor means being positioned with successive ones of said supporting portions and the panels carried thereon supported in a position horizontally over said container during each successive interval of rest, a solder-carrying tray positioned in said molten solder container, means to move said solder-carrying tray upwardly in said container from below the surface of a quantity of molten solder therein to a position adjacent the underside of a printed circuit panel positioned thereover to carry a quantity of molten solder into contact with the underside of the printed circuit panel while maintaining an upwardly projecting solder surface on said tray, and means cooperable with said tray-moving means to effect a substantially slower movement of said tray during a selected range of movement prior to contacting the solder with the underside of the panel, and to effect a correspondingly slow movement of said tray during a selected range of movement during withdrawal from soldering contact, said last-named means preventing the splashing of solder upon contact with the panel and preventing the drawing out of strings of solder upon withdrawal of the tray from soldering contact with the panel.

References Cited in the file of this patent

UNITED STATES PATENTS

| | | |
|---|---|---|
| 1,103,067 | McColl | July 14, 1914 |
| 1,214,420 | Bradley | Jan. 30, 1917 |
| 2,463,158 | De Lorme et al. | Mar. 1, 1949 |